US005563653A

United States Patent [19]
Floryan

[11] Patent Number: 5,563,653
[45] Date of Patent: Oct. 8, 1996

[54] FOCUSSED OUTPUT MICROCHANNEL PLATE FOR AN IMAGE INTENSIFIER TUBE

[75] Inventor: Richard F. Floryan, Roanoke, Va.

[73] Assignee: ITT Corporation, New York, N.Y.

[21] Appl. No.: 424,562

[22] Filed: Apr. 17, 1995

Related U.S. Application Data

[63] Continuation of Ser. No. 239,991, May 9, 1994, abandoned.

[51] Int. Cl.$^{6}$ .................................................. H04N 5/225

[52] U.S. Cl. ................. 348/217; 348/216; 313/103 CM; 313/105 CM; 313/526; 313/528; 313/351; 250/214 R; 250/214 VT

[58] Field of Search ..................................... 348/216, 217; 313/103 CM, 105 CM, 526, 527, 528, 309, 336, 351; 250/214 R, 214 VT

[56] References Cited

U.S. PATENT DOCUMENTS

| | | | |
|---|---|---|---|
| 3,708,673 | 1/1973 | Blacker, Jr. | 250/213 |
| 3,760,216 | 9/1973 | Lasser et al. | 313/94 |
| 4,015,159 | 3/1977 | Zipfel, Jr. | 313/95 |
| 4,095,136 | 6/1978 | Niklas | 313/105 CM |
| 4,498,952 | 2/1985 | Christensen | 313/309 |
| 4,945,286 | 7/1990 | Philips et al. | 313/105 CM |
| 4,974,089 | 11/1990 | Gilligan | 358/211 |
| 5,013,902 | 3/1991 | Allard | 250/213 VT |
| 5,023,511 | 6/1991 | Phillips | 313/524 |
| 5,029,963 | 7/1991 | Naselli et al. | 350/96 |
| 5,084,780 | 1/1992 | Phillips | 359/350 |
| 5,109,469 | 4/1992 | Duggan | 385/146 |
| 5,161,008 | 11/1992 | Funk | 348/217 |
| 5,268,612 | 12/1993 | Aebi et al. | 313/103 |
| 5,281,891 | 1/1994 | Kaneko et al. | 313/309 |
| 5,349,177 | 9/1994 | Thomas et al. | 250/214 VT |
| 5,402,034 | 3/1995 | Blouch et al. | 313/370 |

*Primary Examiner*—Wendy Garber
*Assistant Examiner*—Ngoc-Yen Vu
*Attorney, Agent, or Firm*—Plevy & Assocaites; Patrick M. Hogan

[57] ABSTRACT

A microchannel plate for an image intensifier tube, the microchannel plate comprising a substrate having an input surface and an output surface and a plurality of channels extending therebetween, each of the channels defining a channel wall, wherein the microchannel plate operates as an electron multiplier, whereby each of the channel walls emits a cascade of electrons in response to an electron entering a respective one of the channels, and a focusing element formed on an output of at least one of the channels for preventing spatial dispersion of the cascade of electrons exiting the output thereof.

13 Claims, 3 Drawing Sheets

FOCUSSED OUTPUT MICROCHANNEL PLATE FOR AN IMAGE INTENSIFIER TUBE

This is a continuation of application Ser. No. 08/239,991, filed on May 9, 1994, entitled FOCUSSED OUTPUT MICROCHANNEL PLATE FOR AN IMAGE INTENSIFIER TUBE now abandoned.

FIELD OF THE INVENTION

This invention relates generally to microchannel plates used in image intensifier tubes and more particularly, to a focussed-output microchannel plate which provides low spatial dispersion of electrons emitted from the output side of the microchannel plate.

BACKGROUND OF THE INVENTION

A microchannel plate is a key component of an image intensifier tube. Image intensifier tubes are employed for the purpose of amplifying a low intensity or non-visible radiational image of an object into a readily viewable image. Many industrial and military applications exist for such devices including enhancing the night vision of aviators, rendering night vision to persons who suffer from retinitis pigmentosa, more commonly known as night blindness and photographing astronomical bodies.

The general construction of a currently employed image intensifier tube is exemplified in FIG. 1 which illustrates a Generation III (GEN III) image intensifier tube 10. Examples of GEN III image intensifier tubes can be found in U.S. Pat. No. 5,029,963 to Naselli, et al., entitled REPLACEMENT DEVICE FOR A DRIVER'S VIEWER and U.S. Pat. No. 5,084,780 to Phillips, entitled TELESCOPIC SIGHT FOR DAYLIGHT VIEWING both of which are manufactured by ITT Corporation, the assignee herein.

The GEN III image intensifier tube 10 shown in FIG. 1 comprises an evacuated envelope or vacuum housing 22 having a photocathode 12 disposed at one end of the housing 22 and a phosphor screen 30 disposed at the other end of the housing 22. A microchannel plate (MCP) 24 is positioned within the vacuum housing 22 between the photocathode 12 and the phosphor screen 30.

The photocathode is comprised of a glass faceplate 14 coated on one side with an antifliection layer 16; a gallium aluminum arsenide (GaAlAs) window layer 17; a gallium arsenide (GaAs) active layer 18; and a negative electron affinity (NEA) coating 20.

The MCP 24 is located within the vacuum housing 22 and is separated from the photocathode 12 by gap 34. An MCP is an electron multiplier formed by an array of microscopic channel electron multipliers. The MCP 24 is generally made from a thin wafer of glass having an array of microscopic channels extending between input and output surfaces 26 and 28 respectively. The wall of each channel is formed of a secondary emitting material. The phosphor screen 30 is located on a fiber optic element 31 and is separated from the output surface 28 of the MCP 24 by gap 36. The phosphor screen 30 generally includes aluminum overcoat 32 to stop light reflecting from the phosphor screen 30 from re-entering the device through the NEA coating 20.

In operation, infrared energy coming from an external object impinges upon the photocathode 12 and is absorbed in the GaAs active layer 18, resulting in the generation of electron/hole pairs. The electrons generated by the photocathode 12 are subsequently emitted into gap 34 of the vacuum housing 22 from the NEA coating 20 on the GaAs active layer 18. The electrons emitted by the photocathode 12 are accelerated toward the input surface 26 of the MCP 24 by applying a potential applied across the input surface 26 of the MCP 24 and the photocathode 12 of approximately 800 volts.

When an electron enters one of the channels of the MCP 24 at the input surface 26, a cascade of secondary electrons is produced from the channel wall by secondary emission. The cascade of secondary electrons are emitted from the channel at the output surface 28 of the MCP 24 and are accelerated across gap 36 toward the phosphor screen 30 to produce an intensified image. Each microscopic channel functions as a secondary emission electron multiplier having an electron gain of approximately several hundred. The electron gain is primarily controlled by applying a potential difference across the input and output surfaces of the MCP 24 of about 900 volts.

Electrons exiting the MCP 24 are accelerated across gap 36 toward the phosphor screen 30 by the potential difference applied between the output surface 28 of the MCP 24 and the phosphor screen 30. This potential difference is approximately 6000 volts. As the exiting electrons impinge upon the phosphor screen 30, many photons are produced per electron. The photons create an intensified output image on the output surface of the optical inverter or fiber optics element 31.

The image reproducing effectiveness of prior art MCPs depends in part on the ability of the cascading electrons coming from each channel of the MCP 24, to reach the phosphor screen 30 before any significant spatial dispersion occurs. If the cascading electrons spatially disperse before reaching the phosphor screen 30, the resolution of the intensified image will become degraded.

Spatial dispersion is prevented in current image intensifier tubes by locating the phosphor screen in very close proximity to the output surface of the MCP, and applying a high electric field to the gap 36. This approach has many drawbacks resulting from the employment of high electric fields and close MCP/phosphor screen spacings, including field emission, breakdown, and in extreme cases, pull-off of the aluminum overcoat on the phosphor screen. Ultimately, the result of these drawbacks is the loss of the image intensifier tube.

Therefore, there exists a need in the art of image intensifier devices for an image intensifier that avoids the problems of prior art devices without the usual loss of resolution.

It is therefore, a primary objective of the present invention to provide an image intensifier tube that utilizes a focussed-output MCP (FMCP) to provide an image upon a phosphor screen within a vacuum housing while providing state of the art performance.

SUMMARY OF THE INVENTION

A microchannel plate according to the present invention comprises a substrate having an input surface and an output surface, a plurality of channels extending between the input surface and the output surface, whereby an electron entering one of the channels produces a cascade of electrons and focusing means formed adjacent to the output of at least one of the channels for collimating the cascade of electrons emitted from the channels in response to the received electron.

The focusing means can further include a plurality of conductive layers disposed over the output surface, each conductive layer separated from the other by a non-conductive layer, wherein the conductive layers form an electrostatic lens at each of the channels when a potential difference is applied thereto.

In accordance with another aspect of the present invention, a method for making a microchannel plate, comprising the steps of forming a plurality of channels in a substrate, depositing a first layer of conductive material onto a surface of the substrate; depositing a layer of non-conductive material over the first layer of conductive material; and depositing a second layer of conductive material over the layer of conductive material, whereby the first layer of conductive material, the non-conductive layer and the second layer of conductive material form focussing means for preventing spatial dispersion of secondary electrons emitted from at least one of the channels in response to a received primary electron.

DETAILED DESCRIPTION OF THE DRAWINGS

Figure 1:
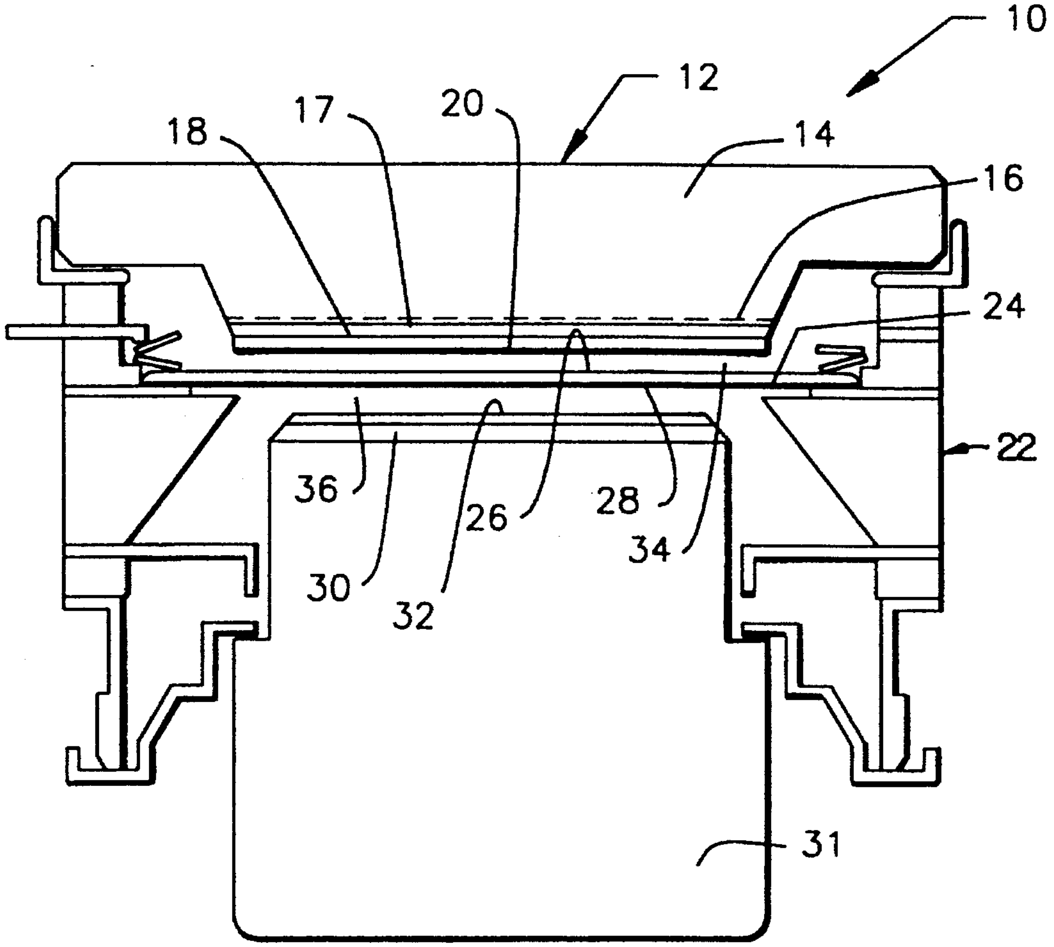
(PRIOR ART) FIG. 1
FIG. 1 is a cross-sectional view of a prior art GEN III image intensifier tube.
Figure 2:
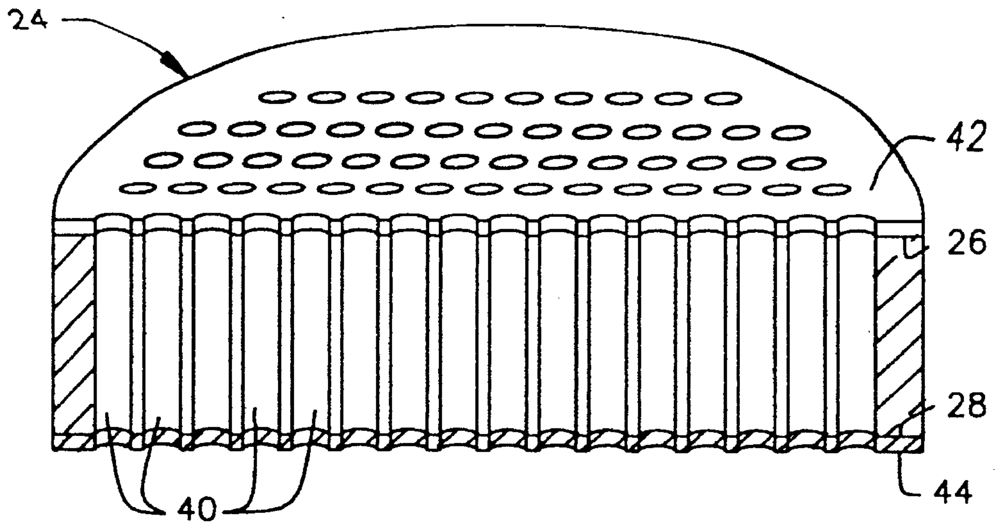
(PRIOR ART) FIG. 2
FIG. 2 is a partial cross-sectional view of the MCP used in the image intensifier tube of FIG. 1.

Referring now to FIG. 2 there is shown a cross-sectional view of the MCP 24 used in the image intensifier tube of FIG. 1. As already mentioned, the MCP 24 is fabricated from a thin wafer of glass having an array of microscopic channels 40 extending between input and output surfaces 26 and 28 respectively. The wall of each channel is formed of a secondary emitting material. As can be seen, input and output surfaces 26 and 28 are made conductive by providing metal electrodes 42 and 44. The electrodes are provided so that electron gain can be controlled by applying a potential difference across the input and output surfaces of the MCP.

Figure 3:
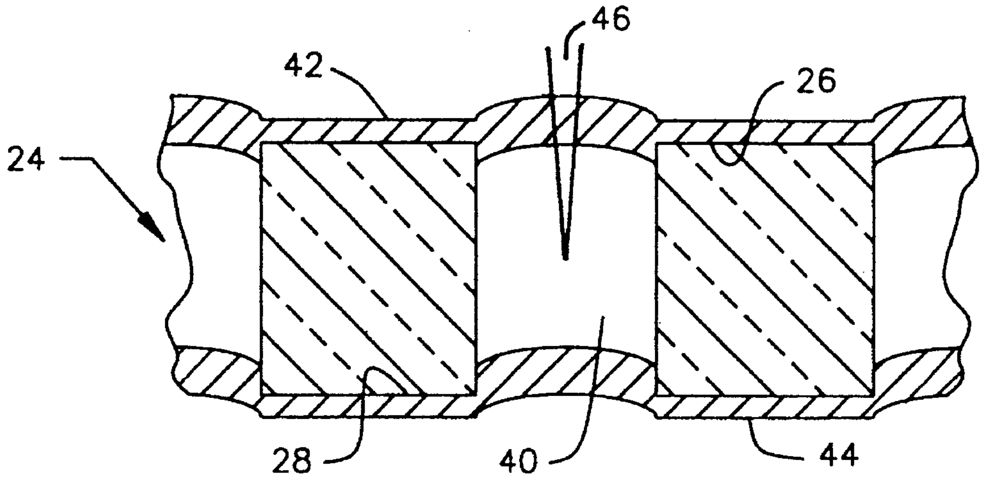
(PRIOR ART) FIG. 3
FIG. 3 is an enlarged view of the MCP shown in FIG. 2.

FIG. 3 is an enlarged view of FIG. 2 and best shows the detail of the channel/electrode structure of prior art MCP 24. The input and output electrodes 42 and 44 of the MCP are formed on respective input and output surfaces 26 and 28 by deposition of a thin metallization layer. The channel axes of MCP 24 are usually biased at an angle 46 ranging between 0° and 12° measured relative to the normal axis of the MCP surface. This configuration helps to prevent electron feedback from the phosphor screen to the photocathode.

As earlier mentioned, when an electron enters a channel in an MCP, a cascade of secondary electrons are produced from the channel wall by secondary emission. This is made possible by making the wall of the channel emissive. When an electron impinges on the channel wall, secondary electrons are emitted in response thereto. The metal electrodes allow a potential difference to be applied across the input and output of each channel. The potential difference generates an electrostatic field which accelerates the cascade of emitted secondary electrons down the channel 40. Each time one of the secondary electrons strikes the wall of the channel it causes additional secondary electrons to be emitted. This sequence continues over and over again as the electrons are accelerated down the channel and produces an amplification of the primary electron. Accordingly, a large pulse of electrons is emitted from the output end of the channel as a result of the input of the primary electron.

Figure 4:
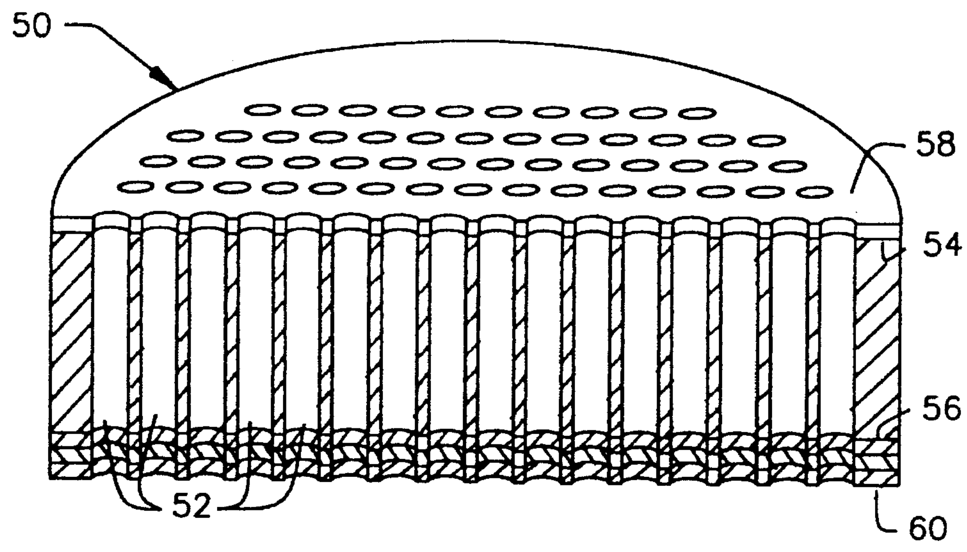
FIG. 4 is a partial cross-sectional view of the MCP according to an exemplary embodiment of the present invention.

Referring now to FIG. 4, there is shown a cross-sectional view of a focused multichannel plate (FMCP) according to the present invention designated by the numeral 50. FMCP 50 includes an array of microscopic channels 52 extending between input and output surfaces 54 and 56 respectively. The channel axes of FMCP 50 are biased at an angle 68 ranging between 0° and 12° measured relative to the normal axis of the MCP surface, however, the preferred angle is 5°. Disposed on the input surface of the FMCP is an input electrode 58 and disposed on the output surface of the FMCP is a focussing means comprised of a multilayered electrode 60 which will be described in greater detail below.

The FMCP according to the present invention is preferably fabricated from a glass wafer which is cut from a boule formed by fusing together an array of glass rods which are cut from a glass core rod. The glass rods are composed of a core glass surrounded by a clad glass of a different composition. After slicing the glass wafers from the boule, a selective etching process removes the core glass to form the hollow channels. The channel wall is made emissive by firing the plates in hydrogen which reduces the exposed glass surface of the channel wall thereby forming a thin silica layer which forms the secondary electron emissive surface. Accordingly, each channel is essentially independent of channels defined in adjacently located glass rods, and is, therefore, capable of operating as a single channel electron multiplier. The diameter of a channel in the FMCP of the present invention can be as small as a few microns, however, if the FMCP is to be used specifically for image intensification as is intended in the present invention, the channel diameters should range between 5 and 12 microns. The channel lengths should be adapted so that the channels have a length to diameter ratio of approximately 40.

The input electrode 58 of the FMCP of the present invention is formed on the input surface of the FMCP by deposition of a thin metallization layer. Nichrome or inconel are the commmonly used as electrode materials for MCPs because they display a good adhesion to the glass surface of the MCP.

Figure 5:
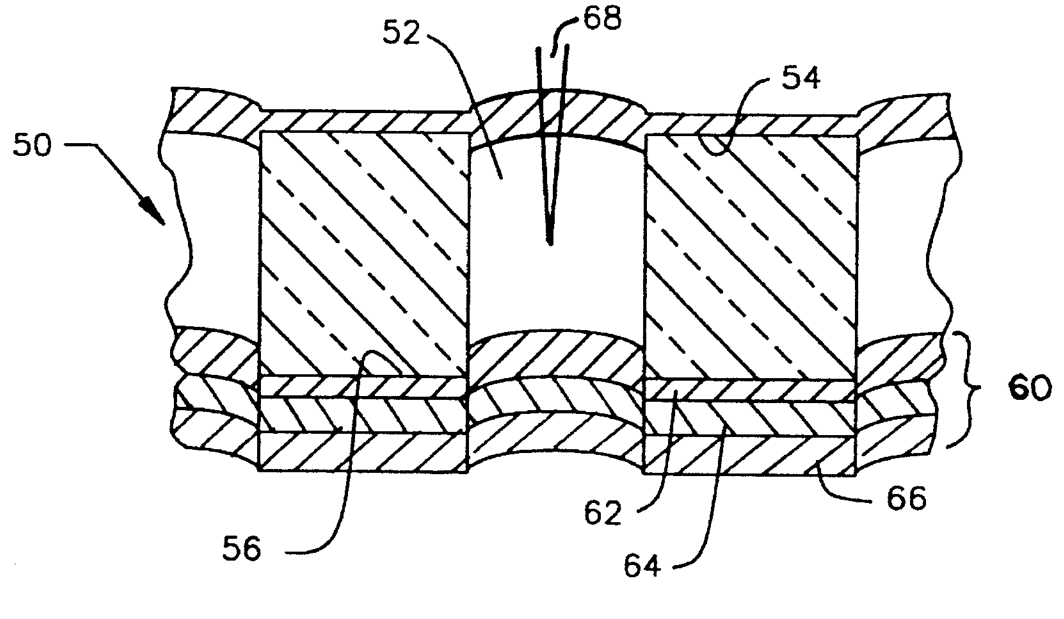
FIG. 5 is an enlarged view of the MCP shown in FIG. 4.

The input electrode 58 is deposited by vacuum evaporation with a collimated beam of metal atoms or any other suitable method. The FMCP is rotated during the metalization process to result in uniform coverage of the input surface of the FMCP. As is best shown in FIG. 5, some penetration of the input electrode into the channels is desirable. The amount of penetration, however, should be limited to approximately one half of the channel diameter. This is necessary because electrode metals, such as inconel or nichrome, display very low secondary electron emission. Consequently, if a primary electron strikes the metallized channel wall, the gain of the FMCP will be lowered and the noise performance reduced because a secondary electron will not be generated.

Still referring to FIG. 5, the focusing means formed by the multilayered electrode configuration will now be described in greater detail below. Note first that the implementation of a focussing structure on the output of the FMCP of the present invention allows the FMCP to be used in any proximity focusing type image intensifier tube.

Proximity focusing image intensifiers are designed to minimize the spreading of the electrons which inherently occurs when an MCP and a phosphor screen are placed facing each other in a plane-parallel orientation and a potential difference is applied thereto. The potential difference accelerates the electrons exiting at the output face of the MCP in a direction perpendicular to the plane-parallel MCP/phosphor screen. Spreading of the emitted electrons occurs, however, because the initial emission velocity generally includes a transverse, as well as an axial, component of velocity. The transverse component of velocity is not affected by the electric field between the MCP and the phosphor screen and consequently, the electron trajectories diverge and cause image blurring.

In proximity focusing image intensifiers, image blurring is minimize by providing close MCP to phosphor screen spacings and high electric fields which help to prevent spatial dispersion of the electrons emitted from the output end of the MCP.

The FMCP according to the present invention eliminates electron spreading by incorporating the multilayered electrode configuration 60 which comprises a first conducting layer or output electrode 62, a non-conducting layer deposited over the output electrode 64, and a second conducting layer or focus electrode 66 deposited over the non-conducting layer 64. Each successive layer of this configuration is deposited such that it penetrates into the channels a lesser amount than the previous layer.

In the exemplary embodiment shown in FIGS. 4 and 5, the multilayered electrode is fabricated over the entire output face 56 of the FMCP which results in a structure whereby an electrostatic lens is formed adjacent to the output of each channel.

Alternatively, the second conducting layer which forms the focussing electrode of the multilayered electrode can be selectively deposited onto the other layers of the multilayered electrode in selected regions of the output face of the FMCP. This can be done to correct luminosity gradients that may be present in image intensifier tube assemblies. The selective deposition can be implemented to obtain different varied outputs from an image intensifer. Reference can be made to U.S. Pat. No. 5,109,469 entitled PHOSPHOR SCREEN FOR CORRECTING LUMINOUS NON-UNIFORMITY AND METHOD FOR MAKING SAME, issued to Duggan and assigned to the assignee herein, ITT Corporation, for a discussion on luminosity gradients present in image intensifier tube assemblies.

These luminosity gradients can be caused by a variety of sources such as the fiber optic element of the intensifier tube, the tilt spacing of the photocathode or fiber optic element or the slight wedge shape in the thickness of the MCP itself. For example, the focussing electrode can be selectively deposited in the area of the outer periphery of the output face of the FMCP to increase the focusing capability of the FMCP in that region.

Nichrome or inconel can be used as first and second electrode materials. Any suitable dielectric material such as glass or the like can be used as the non-conducting layer.

The first and second conducting layers of the multilayered electrode 60 are deposited in the same manner as the input electrode 58 using vacuum evaporation or the like. The non-conducting layer is also deposited by vacuum evaporation or any other like method.

The focussing means of the FMCP of the present invention operates, when a potential difference is applied to the first and second electrodes of the multilayered electrode, to form an electrostatic lens at the output of each channel. Each one of the electrostatic lenses functions to collimate the electrons which are being emitted from the output end of each of the channels and focuses the emitted electrons on the phosphor screen of the image intensifier. Accordingly, spacial dispersion of the emitted electrons is prevented and allows the phosphor screen of the image intensifier to be located at substantially greater distance from the FMCP. This results in reduced field emission, breakdown and pull-off of the aluminum overcoat on the phosphor screen without the usual loss of resolution associated with locating the phosphor screen a greater distance away from the MCP.

The FMCP of the present invention is suitable for use in any image intensifier tube that utilizes an MCP with a proximity-focussed output. Examples of such intensifier tubes include GEN II proximity focussed tubes, GEN II electrostatically focussed input tubes, and GEN III proximity focussed tubes. Moreover, the MCP of the present invention is suitable for use in any past, present or future image intensifier tube which would otherwise use an MCP with a proximity-focussed screen. Further, FMCP of the present invention can also be used with any MCP photomultiplier tube which have segmented anodes.

It is understood that the embodiments described herein are merely exemplary and that a person of ordinary skill in the art may make many variations and modifications to the described embodiments. Any variations, uses or adaptions of the invention described herein are intended to be included within the scope of the invention as defined by the appended claims.

I claim:

1. In a microchannel plate for an image intensifier tube including an evacuated housing with a photocathode disposed at a first end thereof and a fiber optic element disposed at a second end thereof, said microchannel plate being disposed in said evacuated housing between said photocathode and said fiber optic element, the microchannel plate being of the type formed from a substrate having an input surface and an output surface and a plurality of channels extending therebetween, each of said channels defining a channel wall, wherein said microchannel plate operates as an electron multiplier, wherein each of said channel walls emits a cascade of electrons in response to an electron entering a respective one of said channels, the improvement comprising:

focusing means formed on an output of at least one of said channels for preventing spatial dispersion of the cascade of electrons exiting said output thereof, said focusing means including a plurality of conductive layers disposed on said output surface, said conductive layers penetrating said channels thereby partially covering the channel wall with conductive material, wherein said conductive layers form an electrostatic lens when potential difference is applied thereto, said electrostatic lens comprising a focussing electrode disposed selectively over only a portion of said output surface.

2. The microchannel plate according to claim 1, wherein a non-conductive layer is disposed between said conductive layers.

3. The microchannel plate according to claim 1, wherein said focussing electrode is disposed entirely over said output surface.

4. A microchannel plate for an image intensifier tube including an evacuated housing with a photocathode disposed at a first end thereof and a fiber optic element disposed at a second end thereof, said microchannel plate being disposed in said evacuated housing between said photocathode and said fiber optic element, comprising:

a substrate having an input surface and an output surface;

a plurality of channels extending between said input surface and said output surface each of said channels defining a channel wall, whereby an electron entering one of said channels causes said one of said channels to emit a cascade of electrons in response thereto; and focusing means formed on an output of at least one of said channels for collimating said cascade of electrons emitted from said channels on said fiber optic element in response to said received electron, said focusing means including two conductive layers separated by a non-conductive layer wherein said conductive layers penetrate each of said channels and coat a portion of said channel walls with conductive material.

5. The microchannel plate according to claim 4, wherein said focussing means further includes a plurality of electrodes disposed over said output surface.

6. The microchannel plate according to claim 5, wherein said electrodes form an electrostatic lens at said output of said at least one of said channels when a potential difference is applied thereto.

7. The microchannel plate according to claim 4, wherein said substrate is formed from a glass material.

8. A microchannel plate for focussing electrons onto a fiber optic element of an image intensifier tube, comprising a plurality of channels and focussing means formed on an output electrode of said microchannel plate for preventing spacial dispersion of secondary electrons emitted from at least one of said channels in response to a received primary electron, said focussing means including a focussing electrode and an insulating layer separating said output electrode and said focussing electrode, wherein said focussing electrode and said insulating layer penetrate each of said channels and partially coat the channel wall.

9. The microchannel plate according to claim 8, wherein said focussing means comprises an electrostatic lens formed adjacent to at least one of said channels.

10. The microchannel plate according to claim 9, wherein said focussing electrode and said insulating layer are disposed selectively over only a portion of said output electrode.

11. The microchannel plate according to claim 8, wherein said microchannel plate is formed from a glass material.

12. A method for making a microchannel plate used as an electron multiplier in an image intensifier tube including an evacuated housing with a photocathode disposed at a first end thereof and a fiber optic element disposed at a second end thereof, said microchannel plate being disposed in said evacuated housing between said photocathode and said fiber optic element, comprising the steps of:

forming a plurality of channels in a substrate;

depositing a first layer of conductive material onto a surface of said substrate;

depositing a layer of non-conductive material over said layer of conductive material; and depositing a second layer of conductive material over said layer of conductive material wherein said conductive layers penetrating said channels and partially covering the channel wall with conductive material, wherein said second conductive layer is selectively deposited over only a selected portion of said non-conductive layer, whereby said first layer of conductive material, said non-conductive layer and said second layer of conductive material form focussing means for preventing spatial dispersion of secondary electrons emitted from at least one of said channels in response to a received primary electron.

13. The method according to claim 12, wherein said second conductive layer is deposited entirely over said non-conductive layer.

* * * * *